US006694083B2

(12) United States Patent
Paradiso et al.

(10) Patent No.: US 6,694,083 B2
(45) Date of Patent: Feb. 17, 2004

(54) DEVICE INCLUDING A FIBER OPTIC CABLE HARNESS AND ASSOCIATED METHODS

(75) Inventors: Louis Robert Paradiso, Satellite Beach, FL (US); William Alan Zakaluk, Melbourne Beach, FL (US)

(73) Assignee: Harris Corporation, Melbourne, FL (US)

(*) Notice: Subject to any disclaimer, the term of this patent is extended or adjusted under 35 U.S.C. 154(b) by 80 days.

(21) Appl. No.: 09/990,792

(22) Filed: Nov. 14, 2001

(65) Prior Publication Data

US 2003/0091313 A1 May 15, 2003

(51) Int. Cl.[7] .............................. G02B 6/44; G02B 6/00
(52) U.S. Cl. ...................... 385/135; 385/100; 385/113; 385/114
(58) Field of Search ................. 385/100, 135, 385/113, 114

(56) References Cited

U.S. PATENT DOCUMENTS

| | | | |
|---|---|---|---|
| 4,210,773 A | | 7/1980 | Haley et al. .................. 174/72 |
| 4,874,908 A | | 10/1989 | Johansson .................... 174/72 |
| 5,093,885 A | * | 3/1992 | Anton ......................... 385/134 |
| 5,394,503 A | * | 2/1995 | Dietz et al. ................. 385/135 |
| 5,535,298 A | * | 7/1996 | Fasnacht et al. ............ 385/135 |
| 5,615,293 A | | 3/1997 | Sayegh ....................... 385/102 |
| 6,351,590 B1 | * | 2/2002 | Shahid ........................ 385/134 |
| 6,370,303 B1 | * | 4/2002 | Fitz et al. ................... 385/113 |
| 6,480,654 B1 | * | 11/2002 | Church ....................... 385/114 |
| 6,519,395 B1 | * | 2/2003 | Bevan et al. ............... 385/100 |
| 6,594,436 B2 | * | 7/2003 | Sun et al. ................... 385/137 |

OTHER PUBLICATIONS

USConec Ltd., Hickory, North Carolina, Product Information, downloaded from www.usconec.com on Sep. 28, 2001.

* cited by examiner

Primary Examiner—John D. Lee
Assistant Examiner—Tina M Lin
(74) Attorney, Agent, or Firm—Allen, Dyer, Doppelt, Milbrath & Gilchrist, P.A.

(57) ABSTRACT

A device includes a housing 12, a plurality of optical components 14a, 14b within the housing, and a fiber optic cable harness 16 connected to the optical components and extending within the housing. The fiber optic cable harness 16 includes a plurality of optical fibers 20, and a plurality of respective first and second optical fiber connectors. The first optical fiber connectors terminate respective first groups of first ends of the optical fibers, and the second optical fiber connectors terminate respective second groups of second ends of the optical fibers. The first and second groups are different to define at least one cross-connection of optical fibers between the first optical fiber connectors and the second optical fiber connectors. The fiber optic cable harness may include at least one optical fiber support layer carrying the optical fibers, and a plurality of longitudinal strength members extending between the first and second optical fiber connectors.

44 Claims, 3 Drawing Sheets

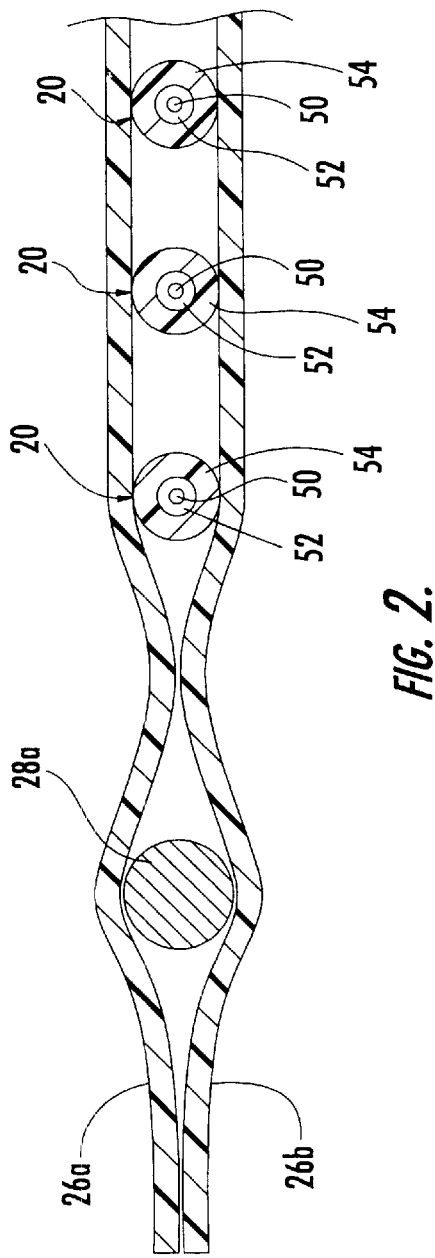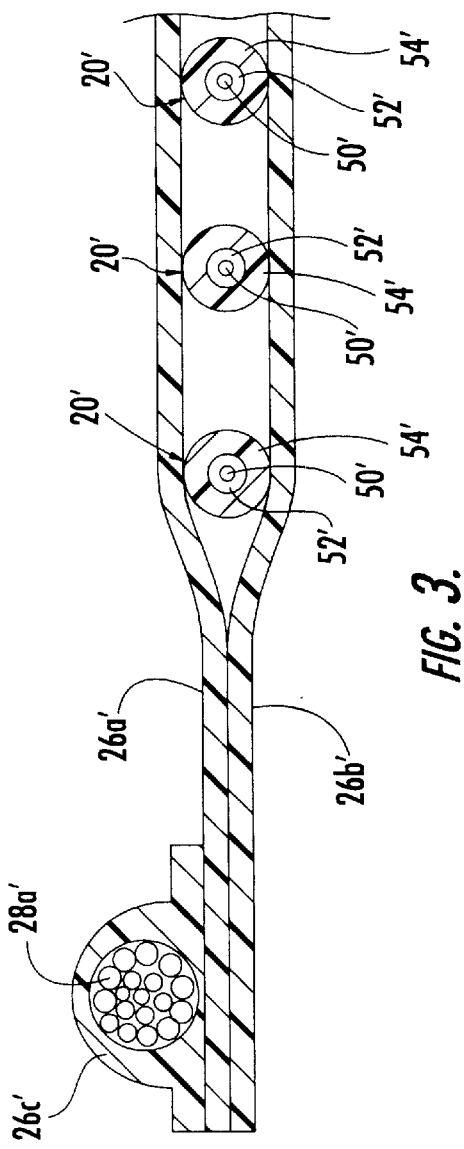
FIG. 2.
FIG. 3.

DEVICE INCLUDING A FIBER OPTIC CABLE HARNESS AND ASSOCIATED METHODS

FIELD OF THE INVENTION

The present invention relates to the field of fiber optics, and more particularly, to fiber optic devices and components.

BACKGROUND OF THE INVENTION

Fiber optic systems are widely used in industries, such as telecommunications and computers. These optical systems may be more economical and more robust than copper wire systems that have been used in the past. An optical system may also make use of a fiber optic ribbon structure, such as a fiber optic ribbon cable, for example. Because of its two-dimensional nature, aligning of the fiber ends is simplified which facilitates termination procedures. Fiber optic ribbon cables may provide large fiber counts in a compact arrangement. Although fiber optic ribbon cables perform successfully in use, known fiber optic ribbon cables are not typically configured to withstand heavy mechanical loads, particularly vibration levels experienced by optical components installed within the housing of an electro-optical device as may be used in automobiles and aircraft, for example.

One example of a fiber optic cable harness for installation within a device is provided by U.S. Conec Ltd., located in Hickory, N.C. under the designation Concours™ Optical Circuits. The fiber optic cable harness includes a plurality of first optical fiber connectors terminating respective first groups of first ends of optical fibers, and a plurality of second optical fiber connectors terminating respective second groups of second ends of the optical fibers.

The optical fibers may be cross-connected between the first and second connectors. The fiber optic cable harness also includes a pair of flexible Kapton™ plastic layers sandwiching the optical fiber. Unfortunately, the U.S. Conec fiber optic cable harness is also susceptible to damage from heavy mechanical loads likely to occur during assembly, handling, maintenance and/or operation.

SUMMARY OF THE INVENTION

In view of the foregoing background, it is therefore an object of the present invention to provide a device including a ruggedized fiber optic cable harness.

This and other objects, features, and advantages in accordance with the present invention are provided by a device comprising a housing, a plurality of optical components within the housing, and a fiber optic cable harness connected to the optical components and extending within the housing.

The fiber optic cable harness preferably comprises a plurality of optical fibers, and a plurality of respective first and second optical fiber connectors. The first optical fiber connectors may terminate respective first groups of first ends of the optical fibers, and the second optical fiber connectors may terminate respective second groups of second ends of the optical fibers. The first and second groups may be different for defining at least one cross-connection of optical fibers between the first optical fiber connectors and the second optical fiber connectors.

The fiber optic cable harness preferably further comprises at least one optical fiber support layer carrying the optical fibers. Moreover, the fiber optic cable harness also may include a plurality of longitudinal strength members extending between the first optical fiber connectors and the second optical fiber connectors. The longitudinal strength members advantageously absorb potentially detrimental strain and/or vibration that would otherwise be imported to the optical fibers.

Each longitudinal strength member may be generally elongate and have opposing first and second ends terminated at respective ones of the first optical fiber connectors and second optical fiber connectors. Each longitudinal strength member may be flexible, and may be bendable and shape retaining.

In one embodiment of the fiber optic cable harness, each longitudinal strength member may be connected to the at least one optical fiber support layer. In another embodiment, the at least one optical fiber support layer may comprise first and second plastic layers connected together with the optical fibers and longitudinal strength members therebetween.

The optical fiber support layer may comprise generally planar portions and may have opposing first and second ends terminated at respective ones of the first optical fiber connectors and second optical fiber connectors. The support layer may also have spaced apart openings therein to facilitate securing within the housing.

The device according to the present invention may further comprise at least one first connector shell for holding the first optical fiber connectors, and at least one second connector shell for holding the second optical fiber connectors. The longitudinal strength members may extend into the first and second connector shells. The first optical fiber connectors may also be carried by the housing so as to be externally accessible.

The device may further comprise electronic circuitry connected to the optical components so that the device is an electro-optical device. The optical components may be carried by at least one circuit board within the device.

Another aspect of the present invention is directed to a method of making a fiber optic cable harness for connection to optical components within a housing of a device. The method preferably comprises terminating first groups of first ends of optical fibers at respective first optical fiber connectors, and terminating second groups of second ends of the optical fibers at respective second optical fiber connectors. The first and second groups may be different for defining at least one cross-connection of optical fibers between the first and second optical fiber connectors. The method may further include supporting the optical fibers using at least one optical fiber support layer, and connecting a plurality of longitudinal strength members to extend between the first and second optical fiber connectors.

BRIEF DESCRIPTION OF THE DRAWINGS

FIG. 2 is an enlarged cross-sectional view taken along lines 2—2 of FIG. 1.

FIG. 3 is an enlarged cross-sectional view of another embodiment of the optical fiber support layers carrying optical fibers and a longitudinal strength member in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternate embodiments.

Figure 1:
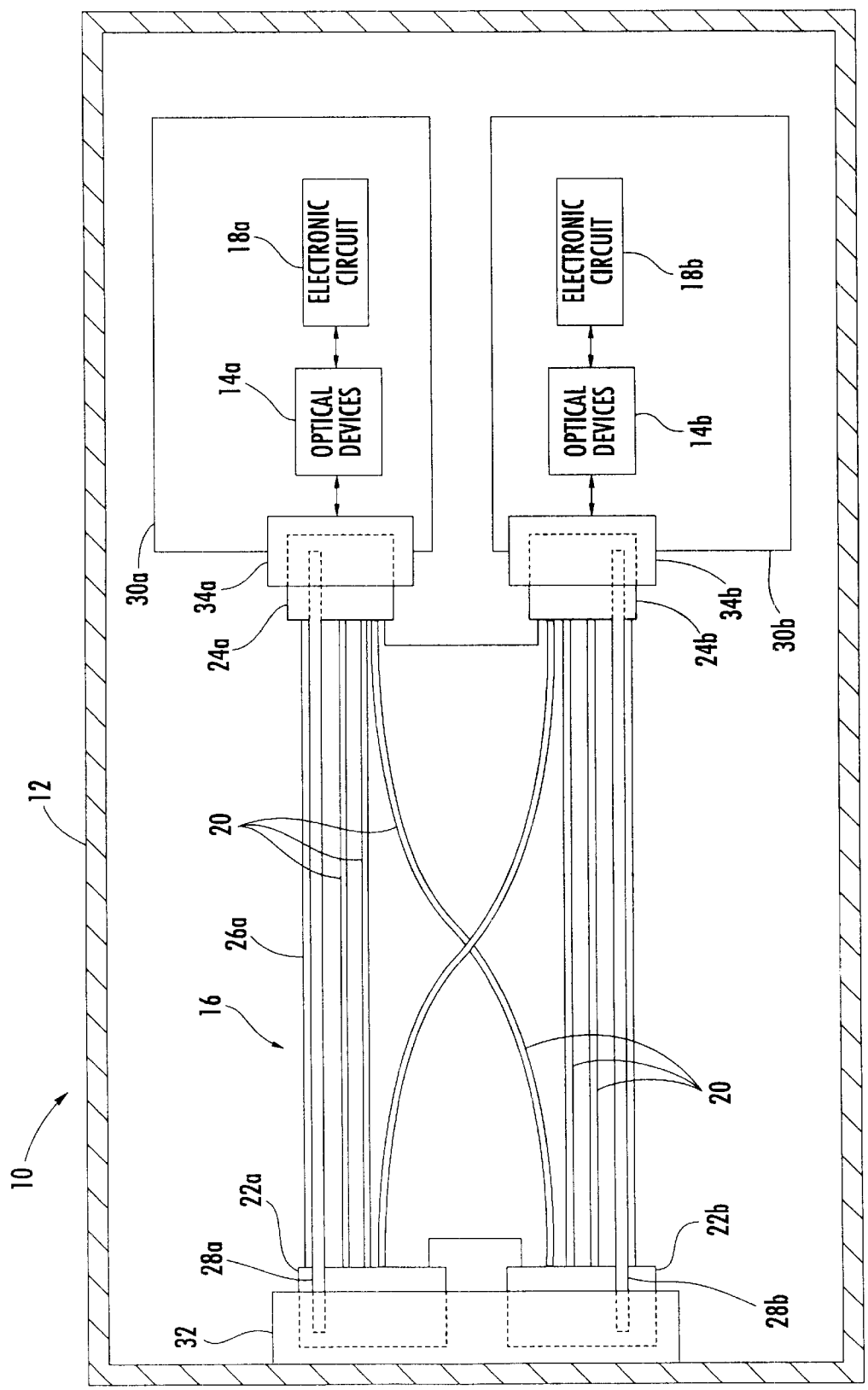
FIG. 1 is a block diagram of a device including a fiber optic cable harness in accordance with the present invention.

Referring initially to FIGS. 1 through 3, an illustrated device 10 includes a housing 12, a plurality of optical components 14a, 14b within the housing, and a fiber optic cable harness 16 connected to the optical components and extending within the housing. In one embodiment, electronic circuits 18a, 18b are connected to the respective optical components 14a, 14b so that the device 10 is an electro-optical device. For example, the optical components 14a, 14b may include one or more optical detectors, and/or other sources, such as lasers or LEDS.

The device 10 may be installed in a number of different types of platforms, including but not limited to aircraft and automobiles, for example. As will be described in greater detail below, the fiber optic cable harness 16 is designed to withstand increased vibration levels commonly associated with these types of platforms.

The fiber optic cable harness 16 comprises a plurality of optical fibers 20 each having opposing first and second ends. A plurality of first optical fiber connectors 22a, 22b terminate respective first groups of first ends of the the optical fibers 20. Similarly, a plurality of second optical fiber connectors 24a, 24b terminate respective second groups of second ends of the optical fiberd 20. The optical fibers 20 and connectors 22a, 22b are arranged to define at least one cross-connection of optical fibers between the first optical fiber connectors and the second optical fiber connectors. This cross-connection is seen in the x-shaped interior optical fibers 20.

The cross-connection of optical fibers 20 between the first optical fiber connectors 22a, 22b and the second optical fiber connectors 24a, 24b is used because there is not a one-to-one correspondence between optical fibers in the first optical fiber connector labeled 22a and the second optical fiber connector labeled 24a, nor is there a one-to-one correspondence between optical fibers in the first optical fiber connector labeled 22b and the second optical fiber connector labeled 24b. The ability to provide and protect cross-connected optical fibers 20 provides great flexibility in component layouts within the device 10 as will be readily appreciated by those skilled in the art.

The fiber optic cable harness 16 further illustratively includes a pair of optical fiber support layers 26a, 26b carrying the optical fibers 20. The fiber optical cable harness 16 also includes a plurality of longitudinal strength members 28a, 28b extending between the first optical fiber connectors 22a, 22b and the second optical fiber connectors 24a, 24b. The longitudinal strength members 28a, 28b advantageously increase the reliability of the fiber optic cable harness 16 by diverting mechanical loads around the optical fibers 20 during assembly, handling, maintenance and/or operation. Within the fiber optic cable harness 16, the optical fibers 20 may have slack portions therein to further avoid mechanical loads.

Since the optical components 14a, 14b may be carried by different circuit boards 30a, 30b, this brings about the need to cross-connect the optical fibers between the first optical fiber connectors 22a, 22b and the second optical fiber connectors 24a, 24b as discussed above. Such a cross-connection of optical fibers 20 may be more susceptible to damage when subjected to increased vibration levels, and consequently, the longitudinal strength members 28a, 28b help to maintain the integrity of the optical fibers 20.

Each longitudinal strength member 28a, 28b is generally elongate and has opposing first and second ends terminated at respective ones of the first optical fiber connectors 22a, 22b and second optical fiber connectors 24a, 24b. Each pair of first and second optical fiber connectors 22a, 22b and 24a, 24b thus has associated therewith a longitudinal strength member.

Additional longitudinal strength members may be provided for any additional pairs of first and second optical fiber connectors. For example, there may be three or more second optical fiber connectors and only two first optical fiber connectors within the device 10. Even if there is not a one-to-one correspondence between the first and second optical fiber connectors, each connector will have associated therewith at least one longitudinal strength member. Consequently, some of the first optical fiber connectors may have more than one longitudinal strength member associated therewith in some embodiment when the number of the second optical fiber connectors is greater than the number of the first optical fiber connectors.

The optical fiber support layers 26a, 26b comprise generally planar portions and have opposing first and second ends terminated at respective ones of the first optical fiber connectors 22a, 22b and the second optical fiber connectors 24a, 24b. As shown in the illustrated embodiment, the optical fibers 20 may be supported by the support layers 26a, 26b in a substantially side-by-side relation.

More particularly, the optical fiber support layers 26a, 26b may include first and second plastic layers connected together with the optical fibers 20 therebetween as shown perhaps best in FIG. 2. In this embodiment, each longitudinal strength member 28a, 28b is also carried between the first and second plastic layers 26a and 26b. In another embodiment, each longitudinal strength member 28a', 28b' is connected to the first plastic layer 26a' using an additional separate plastic layer 26c', for example, as shown in FIG. 3.

Each longitudinal strength member 28a, 28b may be bendable and shape retaining as provided by a suitable sized metal wire, as will be appreciated by those of skill in the art, so that the fiber optic cable harness 16 may be more readily positioned within the housing 12. In other embodiments, such as shown in FIG. 3, each longitudinal strength member 28a', 28b' may comprise an aramid yarn, such as kevlar.

Still referring to FIGS. 2 and 3, each optical fiber 20, 20' may be defined by a conventional core 50, 50' and a cladding 52, 52'. The cladded core may additionally be coated with a suitable polymer coating 54, 54'. The core 50, 52', cladding 52, 52' and coatings 54 are generally known in the art and may be obtained as an integral optical fiber.

Referring again more specifically to FIG. 1, a first connector shell 32 may be provided for holding the first optical fiber connectors 22a, 22b. The first connector shell 32, and thus the first optical fiber connectors 22a, 22b are carried by the housing 12 so as to be externally accessible. In one embodiment, the first optical fiber connectors 22a, 22b may be an MT or MTP ferrule type connector. The illustrated embodiment further includes a pair of second connector shells 34a, 34b for holding the respective second optical fiber connectors 24a, 24b. Similarly, the second optical fiber connectors 24a, 24b may also be an MT or MTP ferrule type connector. MT and MTP ferrule type connectors are two examples of a multi-fiber connector for the fiber optic cable harness 16. Each first and second optical fiber connectors 22a, 22b and 24a, 24b may be sized, for example, to hold 2, 4, 8 or more optical fibers 20, for example.

In other embodiments, the strength members 28a, 28b may extend into the first connector shell 32 and/or into the second connector shells 34a, 34b. Even in these embodiments, the longitudinal strength members 28a, 28b are considered to extend between the first and second optical fiber connectors 22a, 22b and 24a, 24b.

Figure 4:
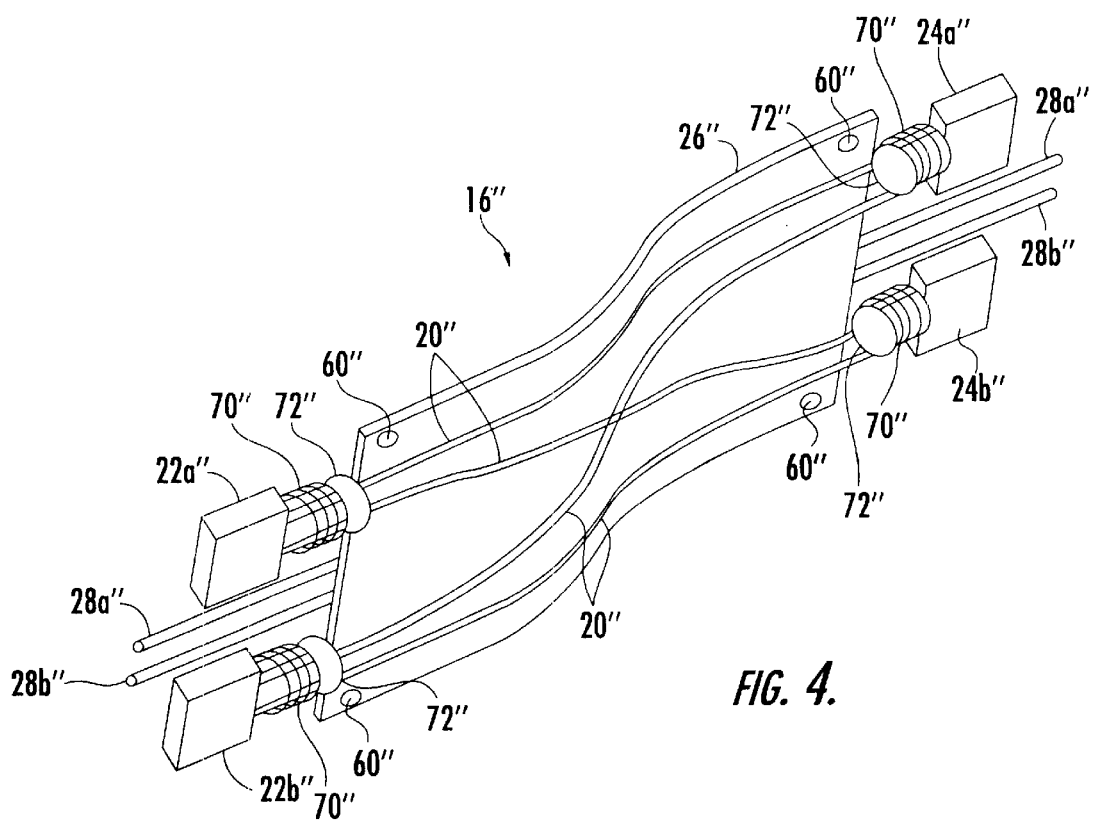
FIG. 4 is a perspective view of another embodiment of a fiber optic cable harness in accordance with the present invention.
Figure 5:
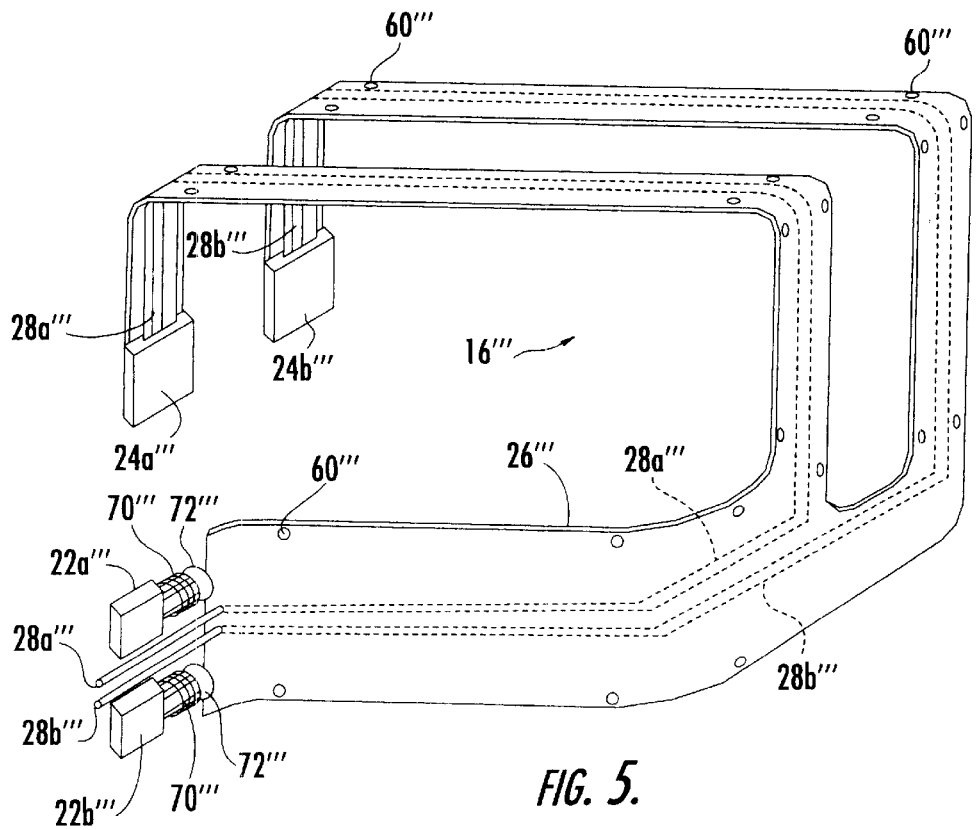
FIG. 5 is a perspective view of yet another fiber optic cable harness in accordance with the present invention.

Referring now additionally to FIGS. 4 and 5, other aspects of the fiber optic cable harnesses 16", 16'" will now be discussed. The fiber optic cable harness 16" illustrated in FIG. 4 may be for a two-dimensional routing configuration within the device 10. The first and second optical fiber connectors 22a", 22b" and 24a", 24b" are positioned within the housing so that the path between the connectors is substantially coplanar.

In this particular aspect of the fiber optic cable harnesses 16", the longitudinal strength members 28a", 28b" extend between the first and second optical fiber connectors 22a", 22b" and 24a", 24b" within the center portion of the optical fiber support layer 26". The strength members 28a", 28b" may also extend into the first connector shell 32" and/or into the second connector shells 34a", 34b" as discussed above.

The support layer 26" also has spaced apart openings 60" therein to facilitate securing within the housing 12. The openings 60" permit tie downs to be connected to the optical fiber support layer 26" to limit motion and stress loads being induced on the optical fibers 20".

At one end of the fiber optic cable harness 16" a nut 72" and spring 70" may be used for securing the respective first optical fiber connectors 22a", 22b" into the optical fiber connector shell 32. Similarly, at the other end of the fiber optic cable harness 16" a nut 72" and spring 70" may be used for securing the respective second optical fiber connectors 24a", 24b" into optical fiber connector shells 34a, 34b.

The perspective view of the fiber optic cable harness 16'" illustrated in FIG. 5 may be for a three-dimensional arrangement within the device. The first optical fiber connectors 22a'", 22b'" and the corresponding nuts 72'" and springs 70'" may be the same as illustrated in FIG. 4. However, in this particular aspect of the fiber optic cable harness 16'", the second optical fiber connectors 24a'", 24b'" may be of a type for connecting to a mezzanine board, such as a PCI (peripheral component interconnect) mezzanine card, for example.

The optical fiber support layer 26'" splits into separate paths from the first optical fiber connectors 22a'", 22b'" to the second optical fiber connectors 24a'", 24b'". The longitudinal strength members 28a'", 28b'" are also carried by the optical fiber support layer 26'" and extend between the first optical fiber connectors 22a'", 22b'" and the second optical fiber connectors 24a'", 24b'".

At the first end of the optical fibers, the longitudinal strength members 28a'", 28b'" may extend into the first connector shell 32'" as discussed above. However, at the second end of the optical fibers, the longitudinal strength members 28a'", 28b'" may terminate in the second optical fiber connectors 24a'", 24b'". The support layer 26'" also has spaced apart openings 60'" therein to facilitate securing within the housing.

Another aspect of the present invention is directed to a method of making a fiber optic cable harness. For clarity and simplicity of explanation, reference is again directed to FIGS. 1 and 2. The fiber optic cable harness 16 is for connection to optical components 14a, 14b within a housing 12 of a device 10. The method includes terminating first groups of first ends of optical fibers 20 at respective first optical fiber connectors 22a and 22b, and terminating second groups of second ends of the optical fibers at respective second optical fiber connectors 24a and 24b. The first and second groups are different to define at least one cross-connection of optical fibers 20 between the first optical fiber connectors 22a, 22b and the second optical fiber connectors 24a, 24b.

The method further includes supporting the optical fibers 20 using at least one optical fiber support layer 26a, 26b, and connecting a plurality of longitudinal strength members 28a, 28b to extend between the first optical fiber connectors 22a, 22b and the second optical fiber connectors 24a, 24b.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A device comprising:
    a housing;
    a plurality of optical components within said housing; and
    a fiber optic cable harness connected to said optical components and extending within said housing, said fiber optic cable harness comprising
        a plurality of optical fibers each having opposing first and second ends,
        a plurality of first optical fiber connectors terminating respective first groups of first ends of the said optical fibers,
        a plurality of second optical fiber connectors terminating respective second groups of second ends of said optical fibers, wherein said first and second groups are different to define at least one cross-connection of optical fibers between said first optical fiber connectors and said second optical fiber connectors,
        at least one flexible optical fiber support layer carrying said optical fibers,
        a plurality of longitudinal strength members extending between said first optical fiber connectors and said second optical fiber connectors, and being carried by said at least one flexible optical fiber support layer.

2. A device according to claim 1 wherein each longitudinal strength member is generally elongate and has opposing first and second ends terminated at respective ones of the first optical fiber connectors and second optical fiber connectors.

3. A device according to claim 1 wherein said at least one optical fiber support layer comprises generally planar portions and has opposing first and second ends terminated at respective ones of the first optical fiber connectors and second optical fiber connectors.

4. A device according to claim 1 wherein said at least one optical support layer supports said optical fibers in substantially side-by-side relation.

5. A device according to claim 1 wherein said longitudinal strength members are connected to said at least one optical fiber support layer.

6. A device according to claim 1 wherein said at least one optical fiber support layer comprises first and second plastic layers connected together with said optical fibers therebetween.

7. A device according to claim 6 wherein said at least one longitudinal strength member is carried between said first and second plastic layers.

8. A device according to claim 1 further comprising:
at least one first connector shell for holding said first optical fiber connectors; and
at least one second connector shell for holding said second optical fiber connectors.

9. A device according to claim 1 wherein said first optical fiber connectors are carried by said housing so as to be externally accessible.

10. A device according to claim 1 wherein said at least one support layer has spaced apart openings therein to facilitate securing within said housing.

11. A device according to claim 1 wherein said at least one longitudinal strength member is flexible.

12. A device according to claim 1 wherein said at least one longitudinal strength member is bendable and shape retaining.

13. A device according to claim 1 further comprising at least one circuit board carrying said optical components.

14. A device according to claim 1 further comprising electronic circuitry connected to said optical components so that the device is an electro-optical device.

15. A device comprising:
a housing;
a plurality of optical components within said housing; and
a fiber optic cable harness connected to said optical components and extending within said housing, said fiber optic cable harness comprising
a plurality of optical fibers each having opposing first and second ends,
a plurality of first optical fiber connectors terminating respective first groups of first ends of the said optical fibers,
a plurality of second optical fiber connectors terminating respective second groups of second ends of said optical fibers, wherein said first and second groups are different to define at least one cross-connection of optical fibers between said first optical fiber connectors and said second optical fiber connectors,
a pair of flexible optical fiber support layers connected together and sandwiching said optical fibers therebetween in substantially side-by-side relation, and
a plurality of longitudinal strength members connected to said optical fiber support layers and extending between said first optical fiber connectors and said second optical fiber connectors, and being carried by said at least one flexible optical fiber support layer.

16. A device according to claim 15 wherein each longitudinal strength member is generally elongate and has opposing first and second ends terminated at respective ones of the first optical fiber connectors and second optical fiber connectors.

17. A device according to claim 15 wherein said optical fiber support layers comprise generally planar portions and have opposing first and second ends terminated at respective ones of the first optical fiber connectors and second optical fiber connectors.

18. A device according to claim 15 wherein said at least one longitudinal strength member is carried between said optical fiber support layers.

19. A device according to claim 15 further comprising:
at least one first connector shell for holding said first optical fiber connectors; and
at least one second connector shell for holding said second optical fiber connectors.

20. A device according to claim 15 wherein said first optical fiber connectors are carried by said housing so as to be externally accessible.

21. A device according to claim 15 wherein said at least one longitudinal strength member is flexible.

22. A device according to claim 15 wherein said at least one longitudinal strength member is bendable and shape retaining.

23. A device according to claim 15 further comprising at least one circuit board carrying said optical components.

24. A device according to claim 15 wherein said device further comprises electronic circuitry connected to said optical components so that the device is an electro-optical device.

25. A fiber optic cable harness for connection to optical components within a housing of a device comprising:
a plurality of optical fibers each having opposing first and second ends,
a plurality of first optical fiber connectors, each terminating respective first groups of first ends of the said optical fibers,
a plurality of second optical fiber connectors, each terminating respective second groups of second ends of said optical fibers, wherein said first and second groups are different to define at least one cross-connection of optical fibers between said first optical fiber connectors and said second optical fiber connectors;
at least one flexible optical fiber support layer carrying said optical fibers,
a plurality of longitudinal strength members extending between said first optical fiber connectors and said second optical fiber connectors, and being carried by said at least one flexible optical fiber support layer.

26. A fiber optic cable harness according to claim 25 wherein each longitudinal strength member is generally elongate and has opposing first and second ends terminated at respective ones of the first optical fiber connectors and second optical fiber connectors.

27. A fiber optic cable harness according to claim 25 wherein said at least one optical fiber support layer comprises generally planar portions and has opposing first and second ends terminated at respective ones of the first optical fiber connectors and second optical fiber connectors.

28. A fiber optic cable harness according to claim 25 wherein said at least one optical support layer supports said optical fibers in substantially side-by-side relation.

29. A fiber optic cable harness according to claim 25 wherein said longitudinal strength members are connected to said at least one optical fiber support layer.

30. A fiber optic cable harness according to claim 25 wherein said at least one optical fiber support layer comprises first and second plastic layers connected together with said optical fibers therebetween.

31. A fiber optic cable harness according to claim 30 wherein said at least one longitudinal strength member is carried between said first and second plastic layers.

32. A fiber optic cable harness according to claim 25 further comprising:
at least one first connector shell for holding said first optical fiber connectors; and
at least one second connector shell for holding said second optical fiber connectors.

33. A fiber optic cable harness according to claim 25 wherein said at least one longitudinal strength member is flexible.

34. A fiber optic cable harness according to claim 25 wherein said at least one longitudinal strength member is bendable and shape retaining.

35. A method for making a fiber optic cable harness for connection to optical components within a housing for connection to optical components within a housing of a device, the method comprising:

terminating first groups of first ends of optical fibers at respective first optical fiber connectors;

terminating second groups of second ends of the optical fibers at respective second optical fiber connectors, wherein the first and second groups are different to define for defining at least one cross-connection of optical fibers between the first optical fiber connectors and the second optical fiber connectors and for defining connections of optical fibers that are not cross-connected between the first and second optical fiber connectors having the at least one cross-connected optical fiber;

supporting the optical fibers using at least one flexible optical fiber support layer; and connecting a plurality of longitudinal strength members to extend between the first optical fiber connectors and the second optical fiber connectors, the plurality of longitudinal strength members being carried by the at least one flexible optical fiber support layer.

36. A method according to claim 35 wherein each longitudinal strength member is generally elongate and has opposing first and second ends terminated at respective ones of the first optical fiber connectors and second optical fiber connectors.

37. A method according to claim 35 wherein the at least one optical fiber support layer comprises generally planar portions and has opposing first and second ends terminated at respective ones of the first optical fiber connectors and second optical fiber connectors.

38. A method according to claim 35 wherein the at least one optical support layer supports the optical fibers in substantially side-by-side relation.

39. A method according to claim 35 wherein the longitudinal strength members are connected to the at least one optical fiber support layer.

40. A method according to claim 35 wherein the at least one optical fiber support layer comprises first and second plastic layers connected together with the optical fibers therebetween.

41. A method according to claim 40 wherein the at least one longitudinal strength member is carried between the first and second plastic layers.

42. A method according to claim 35 further comprising:

providing at least one first connector shell for holding the first optical fiber connectors; and providing at least one second connector shell for holding the second optical fiber connectors.

43. A method according to claim 35 wherein the at least one longitudinal strength member is flexible.

44. A method according to claim 35 wherein the at least one longitudinal strength member is bendable and shape retaining.

* * * * *